Figures 1, 2, 3:
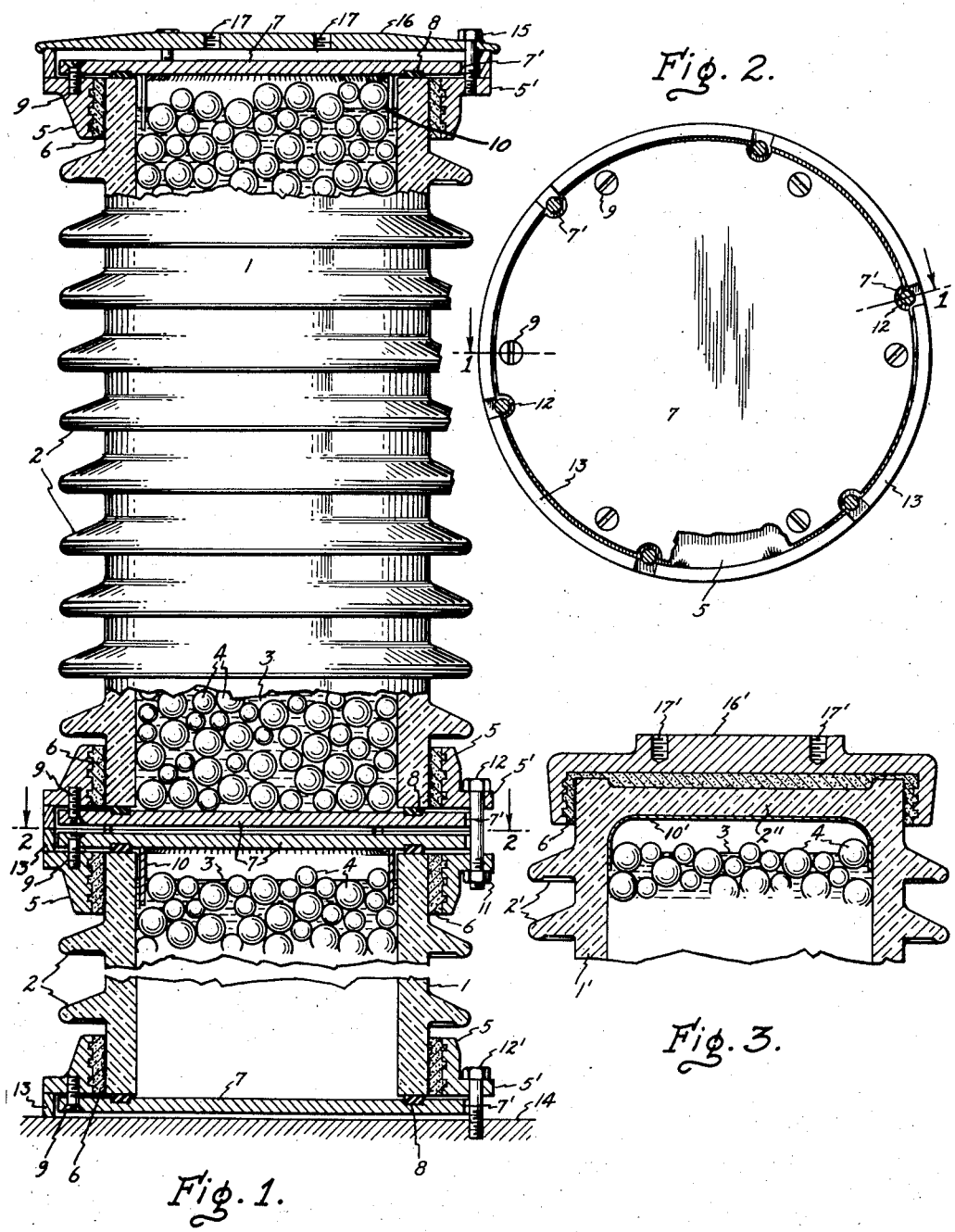

Aug. 11, 1959 L. J. STEVENS 2,899,482
STACKING TYPE INSULATORS
Filed May 8, 1956

Inventor
Leland J. Stevens,
by Gilbert P. Tarleton
His Attorney.

United States Patent Office 2,899,482
Patented Aug. 11, 1959

2,899,482

STACKING TYPE INSULATORS

Leland J. Stevens, Baltimore, Md., assignor to General Electric Company, a corporation of New York Application May 8, 1956, Serial No. 583,574

1 Claim. (Cl. 174—30)

This invention relates to stacking type insulators, and more particularly, to elongated hollow insulating liquid-filled column, pillar or post stacking type electrical insulators.

It is an object of this invention to provide an improved liquid-filled insulator stack.

It is a further object of this invention to provide an improved hollow elongated insulating liquid-filled column, pillar or post stacking type electrical insulator.

It is a further object of this invention to provide an improved end mounting and closure means for elongated hollow electrical insulators.

In my invention the insulator units are hollow and are open at one or both ends thereof. The advantage of using hollow insulator units which are open, and particularly if the unit is open at both ends thereof, is that the piece may be economically formed by an extrusion process. In order to attain high dielectric strength the hollow units may be filled with an electrical insulating liquid. Additionally, if an insulating liquid is utilized the insulating liquid may be conserved and high dielectric strength still be maintained by displacing some of the insulating liquid with an inert filler material such as stones or ceramic pebbles which have a high dielectric strength. By an inert filler material is meant a filler material which will not have a deleterious effect on the insulating liquid.

It will be appreciated by those skilled in the art that column, pillar, or post insulators, or stacks built up from such insulators are subjected to heavy bending loads about the opposite ends thereof. If the units are hollow and a liquid is utilized in the hollow units the end seals must be free of the strains due to these bending loads. If not, alternate bending will momentarily release the pressure on the seals and the insulating liquid will leak out. Therefore, in my invention I provide an improved end mounting and closure means for the open ends of hollow stacking type liquid-filled electrical insulators whereby the strains of alternate bending are not transmitted to the seals of the closure means. The end mounting and closure means are so constructed that if one insulator unit breaks it can be readily replaced without necessitating dismantling of the end mounting and closure means of an adjacent insulator unit.

The end mounting and closure means of my invention comprises a collar or equivalent fitting which is secured to the open end of the hollow insulator. A closure plate or equivalent means is placed over the open end of the insulator and a resilient gasket, seal or equivalent means is disposed between the closure plate and the open end of the insulator. Means is provided for connecting the closure plate to the collar and drawing the closure plate towards the open end of the insulator in order to compress the resilient gasket or seal. Means is provided between the collar and the collar of an adjacent connected unit such that the cover plates of both units are spaced from each other in order to prevent the bending loads imposed on the ends of the units from being transmitted to the end seals of the units. In the event the unit is not connected to an adjacent unit but mounted on a mounting surface means is provided between the collar and the mounting surface so as to space the closure plate from the mounting surface.

While the specification concludes with claims particularly pointing out and distinctly claiming the subject matter which I regard as my invention, it is believed the invention will be better understood from the following description taken in connection with the accompanying drawing in which:

Fig. 1 is a broken away side elevation view of one form of my invention showing parts in section along the sectional line 1—1 of Fig. 2; and Fig. 2 is a sectional view taken along the sectional line 2—2 of Fig. 1; and Fig. 3 is a broken away side elevation view of another form of my invention.

Referring now particularly to Fig. 1, shown therein are a plurality of upright elongated hollow insulator units 1 which are stacked one upon the other. The opposite ends of the units 1 are open, and the units 1 may be made from porcelain or other suitable electrical insulating material. An extrusion and machining process which is well known in the art can be utilized in forming the units 1. After a cylindrical blank is extruded the external petticoats 2 can be formed on the blank by machining or the like. The units 1 are partially filled with an electrical insulating liquid 3. The liquid 3 does not completely fill the units 1 in order to leave some space to allow for the volumetric expansion of liquid 3. If it is desired to conserve on the quantity of liquid 3 an inert filler material such as stones, pebbles or ceramic balls 4 may be used inside the units 1 in place of some of the liquid 3.

Referring now also to Fig. 2, the mounting and closure means adjacent the open ends of the units 1 comprises a collar 5 or equivalent means which is secured to the open ends of the insulators by cement 6 or other suitable means. A closure plate 7 or equivalent means is placed over the open ends of the insulator units and a resilient gasket, seal, or equivalent means 8 is disposed between the plates 7 and the open ends of the insulator units. For instance, the gasket or seal 8 may comprise a continuous rubber ring which will not be deteriorated by the insulating liquid 3. Suitable means such as a plurality of screws 9 connect the plates 7 to the collars 5 and urge or draw the plates 7 towards the collars 5 and the open ends of the insulator units to compress the gaskets or seals 8. In order to eliminate or minimize corona discharge a thin annular metallic shield 10 is connected to the inside surfaces of the top closure plates 7 by welding or the like and the shields 10 extend downwardly into the surface of liquid 3.

The ends of adjacent insulator units are mounted or connected together by suitable means such as nuts and bolts 11 and 12 respectively. A radially extending apertured flange or lip 5' may be formed integrally with the collar 5 for receiving the bolts 12.

Adjacent closure plates 7 do not contact each other but are spaced with respect to each other. It will be appreciated that if plates 7 made contact with each other alternate bending of the insulator units about their ends would cause alternate compression and relaxation of the gaskets or seals 8 whereby the liquid 3 could leak out from within the insulator units. The means for spacing adjacent closure plates 7 with respect to each other comprises spacer elements 13. The spacer elements 13 are disposed radially outwardly of the closure plates 7 and extend in an axial direction beyond their corresponding closure plates 7. The spacer elements 13 are illustrated as comprising a plurality of segments which have been connected to the collars 5. However, it will be appreciated that the spacer elements 13 may comprise integral portions of the collars 5 and need not necessarily take the form of a plurality of spaced segments but may comprise a continuous circular flange integrally formed with the collars 5 and which extend in a lengthwise direction beyond the corresponding closure plates 7. The spacer elements 13 of adjacent ends of the insulator units are held abutted up against each other by the nut and bolt assemblies 11 and 12 and the edges of plates 7 have notches 7' formed therein and spaced from the bolts 12 so that the stresses imposed on the bolts 12 are not transmitted to plates 7. A similar form of end mounting and closure means is utilized at the bottom of the stacked unit for bolting the stacked unit to a mounting or supporting surface 14. That is, spacer elements 13 retain the bottommost closure plate 7 spaced from the surface 14 and a plurality of studs 12' securely fix the stack units on surface 14 and retained spacer elements 13 butted up against surface 14.

The illustrated stack of insulator units may be used for supporting bus bars and switches. To facilitate such use a plurality of studs 15 may clamp a mounting plate 16 against the uppermost spacer elements 13. The mounting plate 16 does not bear against the uppermost closure plate 7 but is slightly spaced therefrom, and the plate 16 may have a plurality of stud receiving apertures 17 formed therein to facilitate the connection of a bus bar or switch components thereto.

My invention is not confined to insulator units which are open at both ends thereof. For instance, the upper end of the top insulator unit of Fig. 1 could be closed in the manner illustrated in Fig. 3. That is, the insulator unit 1' of Fig. 3 has a plurality of petticoats 2' formed thereon and is integrally closed at the upper end thereof by an integral end wall 2". The bottom of the unit 1' is open and may be provided with a mounting and closure means similar to that illustrated in Figs. 1 and 2, and the unit 1' may be filled with insulating liquid and filler material 3 and 4 respectively. In order to eliminate or minimize corona the upper end of unit 1' has a conducting coating 10' applied thereto. The conducting coating 10' extends downwardly into the surface of liquid 3 and performs a function similar to that of the shield 10 of the Fig. 1 form of the invention. An end fitting 16' is secured to the upper end of insulator unit 1' by suitable means such as cement 6, and the end fitting 16' has a plurality of stud receiving apertures 17' formed therein to facilitate the connection of a bus bar or switch components thereto.

While there have been shown and described particular embodiments of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

In an upright elongated hollow insulator which is partially filled with an insulating liquid and solid insulating material, the upper end of said insulator being open, a collar surrounding and connected to said open end, a plate superposed with respect to said open end, a seal between said plate and open end, means connecting and drawing said plate to said collar which compresses said seal, and an annular open shield connected to the inside surface of said plate and extending down into the surface of said liquid, and means connected to said collar which is out of contact with said plate, said last mentioned means extending above said plate for spacing said plate from another and superposed insulator so that the superposed insulator transmits none of its load or bending moments to said plate and its seal.

References Cited in the file of this patent

UNITED STATES PATENTS

| | | |
|---|---|---|
| 2,036,068 | Montsinger | Mar. 31, 1936 |
| 2,253,264 | Burleson | Aug. 19, 1941 |
| 2,522,980 | Aitchison | Sept. 19, 1950 |
| 2,809,228 | Dutton | Oct. 8, 1957 |

FOREIGN PATENTS

| | | |
|---|---|---|
| 532,309 | France | Feb. 1, 1922 |
| 533,573 | Germany | Sept. 16, 1931 |
| 380,943 | Great Britain | Sept. 29, 1932 |
| 902,992 | Germany | Feb. 1, 1954 |